United States Patent [19]

Northrop et al.

[11] 3,724,860

[45] Apr. 3, 1973

[54] OPTICAL DISC DRIVE FOR ORGAN

[75] Inventors: John H. Northrop, La Canada; Eugene C. Jones, Long Beach; George W. Sioles, Palos Verdes Estates; Gary W. Mellette, Hermosa Beach, all of Calif.

[73] Assignee: Mattel, Inc., Hawthorne, Calif.

[22] Filed: Dec. 10, 1970

[21] Appl. No.: 96,813

[52] U.S. Cl. .......................274/9 B, 274/1 G, 274/2

[51] Int. Cl. .......................G11b 17/04, G11b 1/00

[58] Field of Search ...........274/9 B, 2, 1 G, 4 H, 4 E; 353/19

[56] References Cited

UNITED STATES PATENTS

| | | | |
|---|---|---|---|
| 3,411,791 | 11/1968 | Dennis | 274/10 R |
| 3,245,312 | 4/1966 | Paull | 353/19 |
| 2,508,845 | 5/1950 | Thompson | 274/9 B |
| 3,377,072 | 4/1968 | Gentilini | 274/9 B |
| 3,425,701 | 2/1969 | Robinson et al. | 274/9 B |

*Primary Examiner*—Leonard Forman
*Assistant Examiner*—Steven L. Stephan
*Attorney*—Seymour A. Scholnick

[57] ABSTRACT

An electronic organ of a type that utilizes an optical disc record to generate sounds, which is constructed to allow rapid and easy installation and removal of disc records, including an organ housing with a doorway through which disc records can be installed and removed and a spindle for projecting through the central hole of the disc record to locate it while it revolves. The doorway opens to a pan with side walls and an end wall that are spaced from the spindle by distances slightly larger than the radius of the disc record, so that a record pushed in until it hits the rear wall and then released will automatically fall onto the tapered spindle. A door which can cover the doorway, raises a record lifting member when the door is open to guide an inserted disc over the top of the spindle, and then lowers the record lifting member when the door is closed to allow the disc to fall onto the spindle. The disc is driven by a drive wheel which rotates on a movable axle, and a link coupled to the door deflects the axle when the door is opened to move the drive wheel away from a disc record. The movable axle also operates an on-off switch.

8 Claims, 13 Drawing Figures

JOHN H. NORTHROP
EUGENE C. JONES
GEORGE W. SIOLES
GARY W. MELLETTE
INVENTORS

BY [signature]
ATTORNEY

JOHN H. NORTHROP
EUGENE C. JONES
GEORGE W. SIOLES
GARY W. MELLETTE
INVENTORS

BY [signature]

ATTORNEY

JOHN H. NORTHROP
EUGENE C. JONES
GEORGE W. SIOLES
GARY W. MELLETTE
INVENTORS

BY [signature]

ATTORNEY

JOHN H. NORTHROP
EUGENE C. JONES
GEORGE W. SIOLES
GARY W. MELLETTE
INVENTORS

BY [signature]

ATTORNEY

JOHN H. NORTHROP
EUGENE C. JONES
GEORGE W. SIDLES
GARY W. MELLETTE
INVENTORS
BY [signature]
ATTORNEY

OPTICAL DISC DRIVE FOR ORGAN

BACKGROUND OF THE INVENTION

1. Field of the Invention

This invention relates to electronic organs and, more particularly, to an electronic organ which utilizes interchangeable disc records to produce a variety of sounds.

2. Description of the Prior Art

One type of electronic organ utilizes a disc record such as an optical disc with many concentric tracks of varying opacity that define sounds. Light which shines through the different tracks onto photoelectric cells generates signals which can be amplified and played through a loudspeaker to produce sounds. Each record may contain a large number of concentric tracks, such as 50, each track representing a sound of different pitch or sounds representing instruments playing in a predetermined rhythmic pattern. The organ can be utilized to play sounds recorded by different instruments or representing different rhythmic patterns by replacing the disc with another that defines the new sounds. In order to allow operators to use the organ with a minimum of instruction and in as easy a manner as possible, it is desirable that the organ be constructed so that a disc can be easily replaced, as by merely opening a door, pulling out the old disc, inserting a new disc through the doorway and closing the door.

The disc organ may employ rollers that engage opposite faces of the disc to rotate it while light shines through the record tracks. When the disc is not rotating, it is desirable that the driving rollers disengage from the disc so that there will be no permanent deformation of the rollers. Although the operator can be instructed to be sure to disengage the driving mechanism when the organ is off, some operators are likely to be negligent about this. A foolproof mechanism which prevented drive roller deformation by reason of operator negligence would be desirable in such an organ.

OBJECTS AND SUMMARY OF THE INVENTION

An object of the present invention is to provide an electronic organ of the type which utilizes disc records, which allows for the installation and removal of a disc record in an extremely simple manner.

Another object is to provide an organ which utilizes disc records, which resists damage to drive rollers that rotate the records.

In accordance with one embodiment of the invention, an electronic organ is provided which can receive an optical disc record with a hole at its center, the organ being constructed to allow rapid insertion and removal of the disc in an extremely simple manner. The organ housing has a doorway at its front through which a disc can be inserted for reception on a spindle. A pair of side walls within the organ are spaced from the spindle by a distance approximately equal to the radius of the disc, so that as the disc is inserted its hole passes over the spindle. An end wall is spaced behind the spindle by approximately the radius of the disc, so that if the disc is inserted far enough to hit the end wall and is then released, it falls onto the spindle.

In order to allow the inserted disc to ride over the spindle instead of hitting it, a record lifting member is provided which can move up and down. A door which can cover and uncover the doorway is coupled by a link to the record lifting member. When the door is opened to receive a disc, the lifting member is raised to guide the record over the spindle, and when the door is closed the lifting member drops to allow the disc to fall onto the spindle.

The disc is rotated by a pair of wheels, including a flywheel that engages the upper face of the disc at its rim and a motor driven drive wheel that engages the lower face of the disc opposite the flywheel. The drive wheel is held on an axle that is pivotally mounted, so that it can deflect to move the drive wheel between a first position wherein it engages both the lower face of the disc and a motor shaft, and a second position wherein it is disengaged from both the disc and the motor shaft. A link coupled to the door deflects the drive wheel axle and therefore the drive wheel thereon away from the record disc when the door is opened, and releases them when the door is closed.

A manually operated on-off switch knob is coupled by a link arrangement to the movable drive wheel axle. When the switch knob is turned to its off position, the link arrangement moves the axle away from the disc. This prevents application of pressure by the drive wheel to a stationary disc over a long period of time when the organ is off, to prevent a permanent deformation of the drive wheel. When the axle deflects, it operates an on-off switch to turn off the motor. Thus, the motor is turned off when either the switch knob is turned to "off" or the door is opened to receive or remove a disc.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 9:
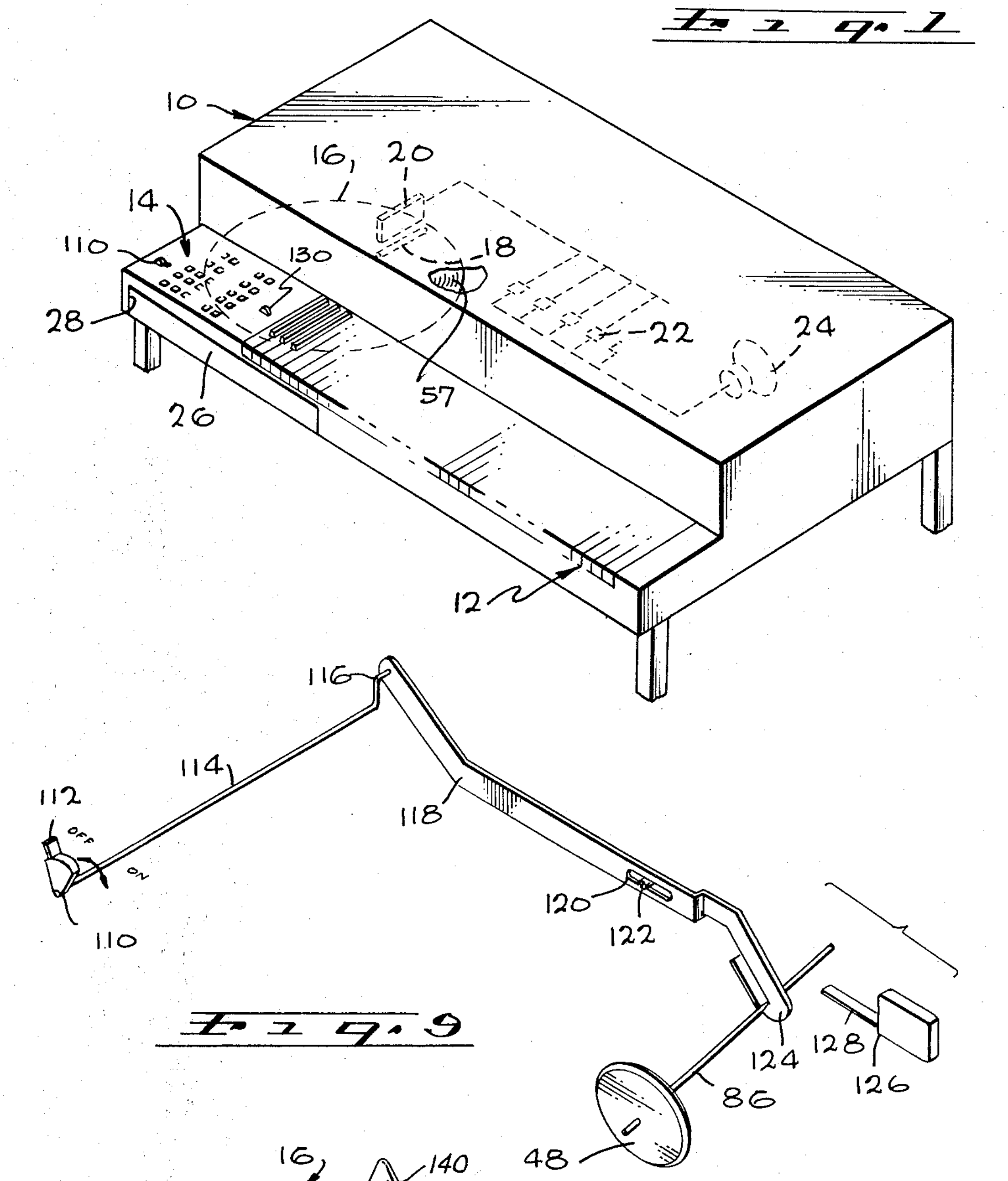
FIG. 1 is a perspective view of an organ constructed in accordance with the invention.
FIG. 9 is a partial perspective view of the mechanism of FIG. 2, showing the operation of the manual on-off switch thereof.

FIG. 1 illustrates an organ constructed in accordance with the invention which includes a housing 10 that carries a keyboard 12 and group of chord buttons 14 that can be depressed to produce musical sounds. The organ utilizes an optical disc record 16 to generate musical sounds. Such a disc may be formed from a sheet of flexible plastic which holds a photographic emulsion, and the emulsion may define many concentric tracks on which sounds from musical instruments have been recorded. The disc is rotated while light from a light source 18 shines through the disc to a series of photocells contained in a pickup head 20. The photocells of the head 20 are coupled through switches 22 operated by the keyboard 12 and buttons 14, to an amplifier and loudspeaker arrangement 24 which produces audible sounds representing the sounds recorded on the tracks of a disc record. A single record 16 may contain a number of tracks such as 57, some of which may represent sustained tones of different pitches by a single instrument such as a saxaphone, and other tracks representing chords of that instrument or a group of instruments playing an accompaniment pattern of notes. The operator can replace the disc 16 with another disc which may represent sounds produced by a different instrument such as a mandolin or which contains accompaniments suitable for different types of melodies. Such replacement is accomplished by opening a door 26 to uncover a doorway 28 at the front of the organ housing 10, pulling out the disc 16, and inserting another disc in its place. The present invention is directed largely to the mechanism which allows for the rapid insertion and removal of optical disc records in the organ.

Figure 3:
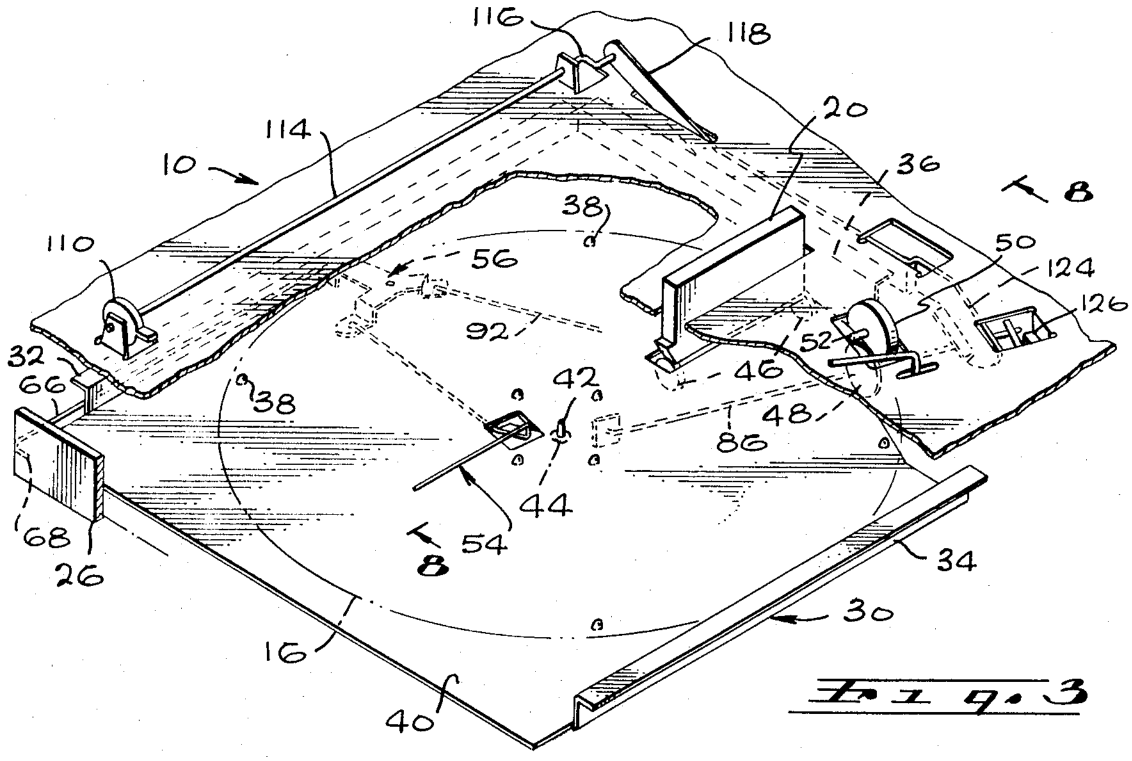
FIG. 3 is a partial perspective view of the disc driving region of the organ of FIG. 1.

As illustrated in FIG. 3, the organ housing includes a pan 30 in which the disc 16 is received, the pan having a pair of side walls 32, 34 at opposite sides of the doorway 28 and an end wall 36 spaced rearwardly from the doorway. The disc 16 is supported on dimple-like protuberances 38 formed in a bottom wall 40 of the pan and arranged in two concentric circles. A spindle 42 projects through a hole in the pan and through a hole 44 formed at the center of the disc record 16. When the record 16 is supported on the protuberances 38 and revolves about the spindle 42, it passes beneath the head 20. A pair of rollers 46 which bear against the lower face of the disc, hold it against the head 20 to assure good pickup fidelity. The disc is driven by a drive wheel 48 that projects through a hole in the bottom of the pan and engages a lower face of the disc near its rim. A flywheel 50 has a hub portion 52 that engages the upper face of the rim at a position opposite the drive wheel 48, to back up the drive wheel and to maintain a constant rotational speed of the disc record.

Figure 4:
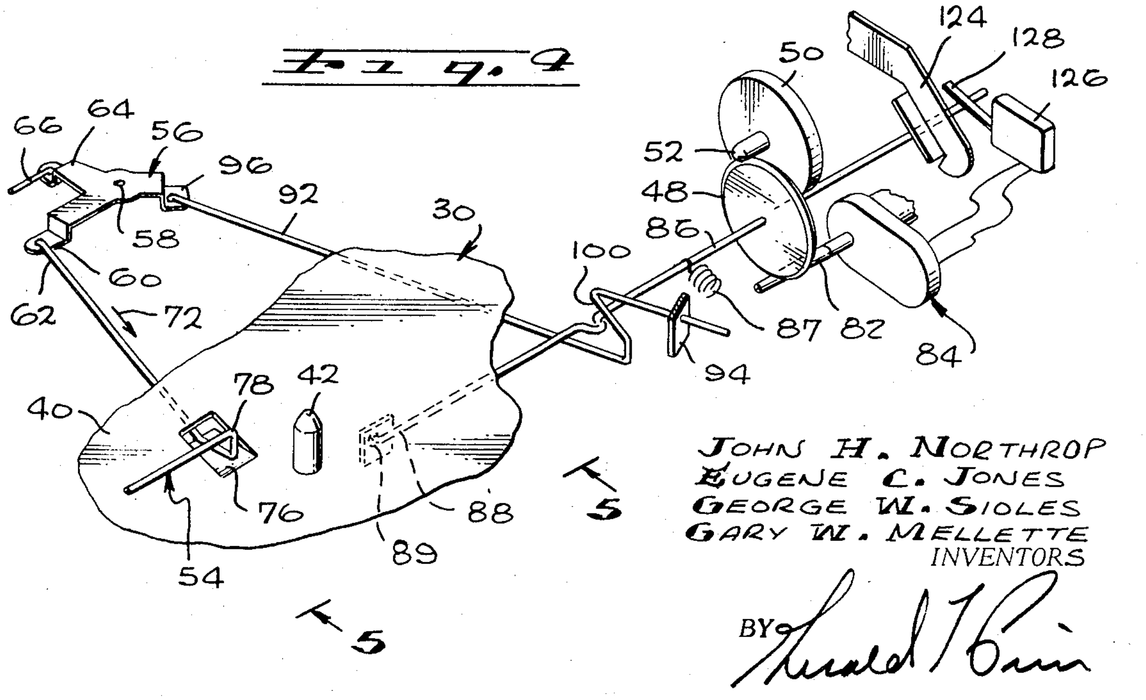
FIG. 4 is a partial perspective view of the disc driving mechanism of FIG. 2, with the door through which discs are received being closed.

In order to install a disc record, the operator first opens the door 26 and inserts the record into the pan 30. The record must move over the spindle 42, between the head 20 and rollers 46, and between the flywheel hub 52 and drive wheel 48. FIG. 4 illustrates a mechanism for facilitating installation of the record, by automatically lifting it over the spindle 42 and allowing reception between the flywheel hub 52 and drive wheel 48. The lifting of the record over the spindle 42 is accomplished by a record lifting member 54 which is in the form of a bent rod or wire. A bell crank or lever 56 which is pivotally mounted about an axis 58 on the housing below the bottom wall 40 of the pan, has one arm 60 which is pivotally coupled to an inner end portion 62 of the lifting member 54. Another arm 64 of the lever is pivotally coupled to one end of a link 66 whose opposite end 68 is pivotally coupled to the door 26.

Figure 5:
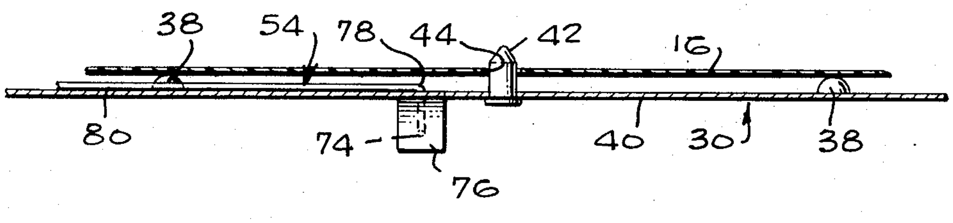
FIG. 5 is a view taken on the line 5—5 of FIG. 4.
Figure 6:
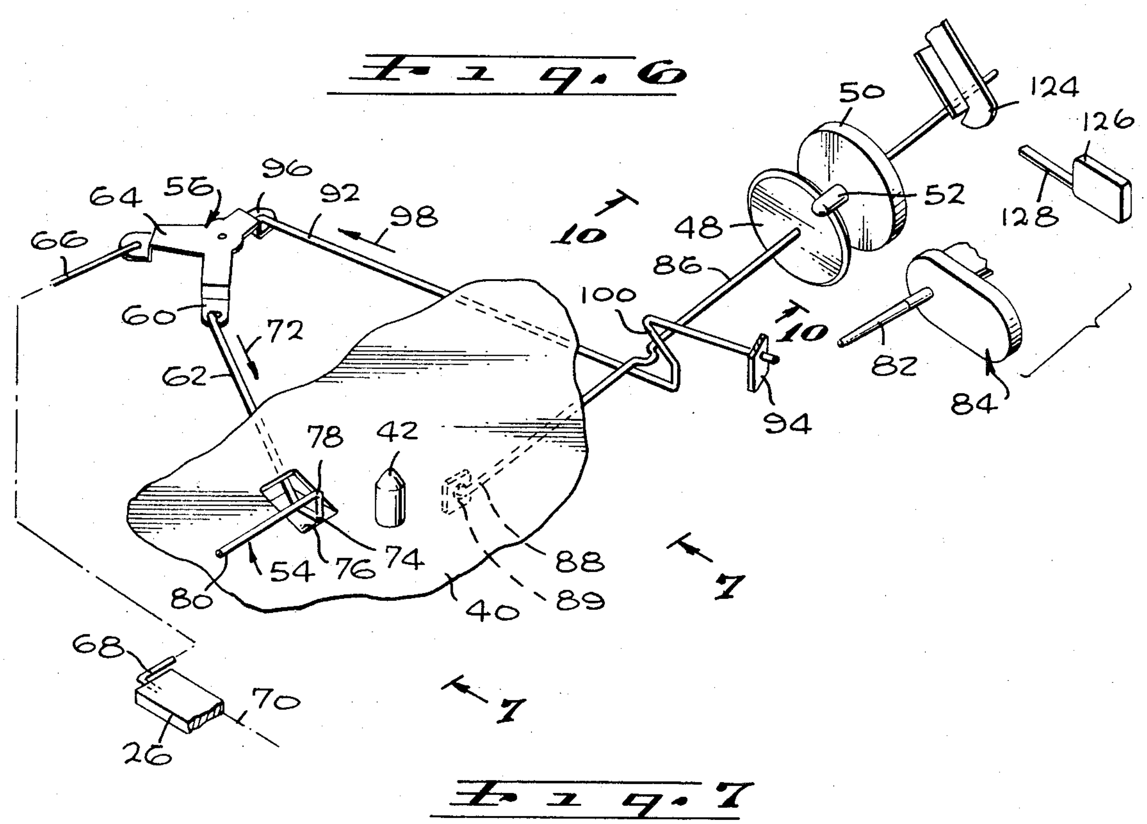
FIG. 6 is a partial perspective view of the mechanism of FIG. 4, but with the door open.
Figure 7:
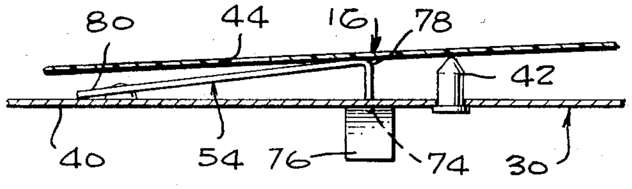
FIG. 7 is a view taken on the line 7—7 of FIG. 6.

As shown in FIG. 6, when the door 26 pivots about the axis 70, to an open position, the link 66 is pulled and it pivots the lever 56 to move the record lifting member 54 in the direction of arrow 72. An outer portion 74 of the lifting member, which rests on a ramp 76 formed in the bottom wall 40 of the pan, then slides up the ramp. A portion 78 of the lifting member is then raised to lift disc records over the top of the spindle 42. As shown in FIG. 7, the lifting member 54 can then guide a record disc 16 over the top of the spindle 42. In order to guide the record disc smoothly over the top of the spindle, the lifting member 54 is provided with a long guiding portion 80 with one end that lies against the bottom wall 40 of the pan to form a ramp along which disc records move when they are inserted. When the disc has been fully inserted and the door 26 is closed, the record lifting member returns to its original position and, as shown in FIG. 5, the guide portion 80 and the rest of the lifting member then lie below the level of the disc 16 to prevent interference with it. The protuberances or dimples 38 in the pan then support the disc.

Figure 7A:
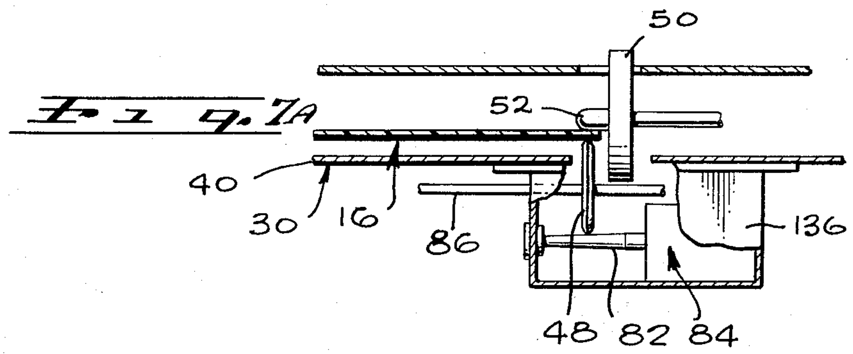
FIG. 7A is a sectional view taken on the line 7A—7A of FIG. 2.

The insertion of a disc not only requires that it clear the spindle, but also requires that it be received between the flywheel hub and drive wheel 48. As shown in FIG. 4 and FIG. 7A, the drive wheel 48 is driven by a tapered shaft 82 of a motor 84 that is mounted below the level of the bottom pan wall 40. The drive wheel 48 is rotatably mounted on an axle 86. The axle 86 has an inner end 88 that projects through a large hole 89 in the frame, the large hole 89 allowing the axle to pivot. A spring 87 urges the axle 86 to pivot towards a position where it holds the drive wheel 48 simultaneously engaged with the motor shaft 82 and with a lower face of the disc 16 opposite the hub 52 of the flywheel. In order to insert a record disc into position, the axle 86 must be deflected laterally and downwardly so that the drive wheel 48 is moved away from the hub of the flywheel 50. Such movement is accomplished by a deflecting rod 92 which has one end slidably engaged with a bracket 94 on the housing and an opposite end pivotally engaged with an arm 96 of the lever 56.

When the door 26 is opened as shown in FIG. 6, the deflecting rod 92 moves in the direction of arrow 98. An angled portion 100 of the rod then moves against the axle 86 to deflect it to the side and downwardly, so that the drive wheel 48 thereon moves downwardly and to the side. The drive wheel 48 then is further away from the flywheel 50 and a disc can be more easily inserted between the flywheel and drive wheel. When the door is closed, the inclined portion 100 of the deflecting rod releases the axle 86 to allow the drive wheel 48 to re-engage the motor shaft 82 and the portion of the disc opposite the flywheel hub 52 so that it can drive the disc.

Figure 8:
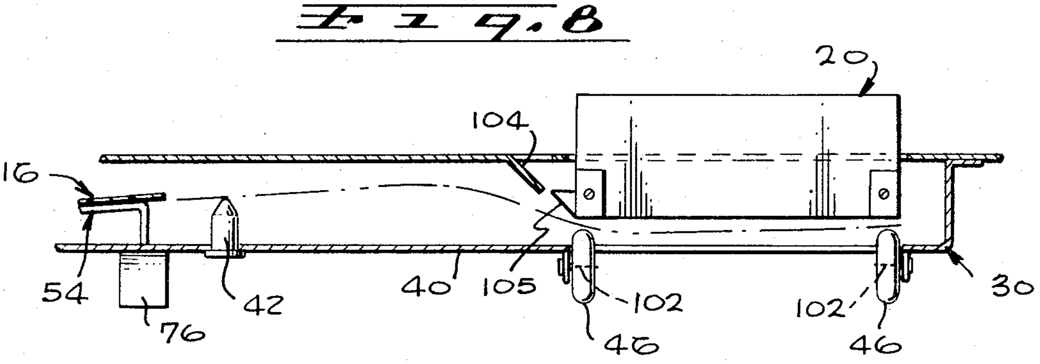
FIG. 8 is a sectional view taken on the line 8—8 of FIG. 3, showing the manner in which a disc is inserted.

When the disc record is inserted, it must not only pass over the spindle 42 and between the flywheel 50 and drive wheel 48, but must also pass beneath the pickup head 20. FIG. 8 illustrates the arrangement of the head 20 and the wheels 46 that hold the disc against the head. Each of the wheels 46 is mounted on a resilient wire 102 that can readily deflect. The wheels have rounded rims so that as a disc is inserted between the head and wheels, the wheels automatically deflect the wires on which they are mounted to receive the disc. In order to aid in the insertion of the disc, a guide flange 104 is formed in the housing to direct the disc downwardly under the head. The head has an inclined forward surface 105 to further guide the disc. Thus, when the door 26 to the housing is opened, a record lifting member is moved up to guide a disc over the spindle 42 while the drive wheel 48 is deflected downwardly to receive a disc under the flywheel hub 52. As the disc is inserted, it automatically moves over the spindle, under the head 20, and under the hub 52 of the flywheel. When the door is closed, the disc is automatically lowered onto the spindle and the drive wheel 48 automatically moves upwardly to engage the disc to drive it.

When an operator inserts an optical disc through the doorway 28 at the front of the organ housing, he cannot easily view the spindle to guide the disc so that its central hole is over the spindle. The operator also cannot shift the record to feel it falling over the spindle since the record lifting member 54 prevents the record from falling completely onto the spindle until the door is closed. In order to facilitate record insertion, the pan 30, best shown in FIG. 3, is constructed so that the operator merely has to insert the disc as far as it will go, and the disc will then automatically fall onto the spindle when the door is closed. To accomplish this, the side walls 32, 34 of the pan are spaced from the axis of the spindle 42 by a distance approximately equal to the radius of the disc record 16. Also, the end wall 36 is spaced from the spindle 42 by approximately the radius of the disc. Accordingly, when the disc is moved as far as it can be pushed into the pan, the central hole 44 of the disc will lie approximately directly over the spindle 42 and release of the record causes it to fall onto the spindle.

Figure 8A:
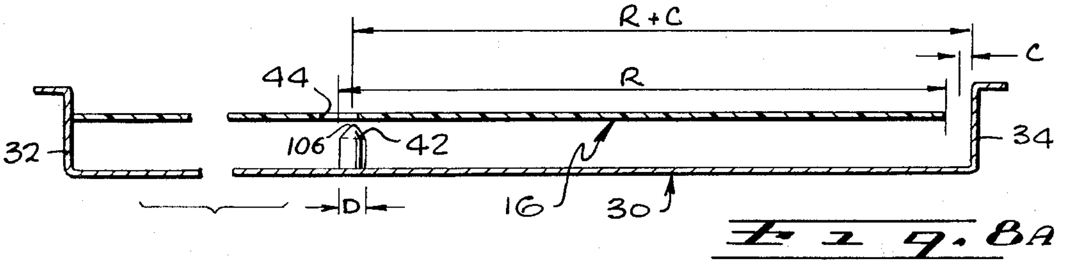
FIG. 8A is a sectional side view of the disc receiving region of FIG. 3, showing the clearances of a disc with the side walls of the region.
Figure 10:
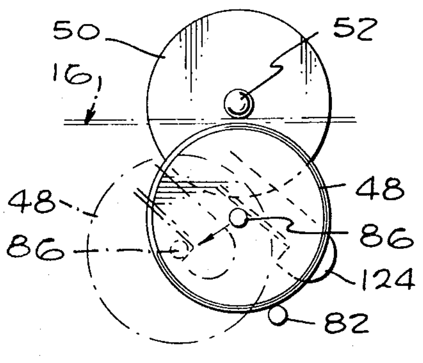
FIG. 10 is a view taken on the line 10—10 of FIG. 6, showing the manner in which the drive wheel shaft is deflected.

In order to prevent rubbing of the rim of the record against the side and end walls of the pan, a small clearance distance is provided. That is, the side walls 32, 34 and end wall 36 of the pan are spaced from the axis of the spindle 42 by slightly more than the radius of the disc record 16. However, the clearance is small enough to assure that the disc will fall onto the spindle when the door is closed. FIG. 8A illustrates the relationship between the radius R of the disc, and the diameter D of the spindle, and the distance R+C of a side wall 34 from the axis of the spindle. When the disc falls onto the spindle 42, there is a clearance C between the rim of the disc and the side wall 34. When the disc is inserted into the region of the pan, it may be left touching one of the side walls such as wall 32, as shown. However, the clearance distance C is small enough so that the tip 106 of the tapered spindle will lie within the hole 44 at the center of the record. Thus, when the record is released it will fall onto the spindle. In order to assure this, the clearance distance C should be less than the radius of the spindle, or in other words, less than one half D. In a similar manner, the end wall 36 is spaced from the spindle 42 so that the clearance C between it and the rim of a record disc is less than the radius of the spindle 42. When an operator inserts a disc until it hits the end wall 36, and then closes the door, the disc will always fall onto the spindle.

The drive wheel 48 bears against the lower face of a disc with a substantial force whenever the axle 86 on which it is mounted is free of restraint. If the organ is turned off while the drive wheel bears against the disc, and the organ is left in this condition for an extended period, the drive wheel may be permanently deformed (develop a flat spot) where it contacts the optical disc. It is also possible for the disc to become deformed. To prevent such a deformation, provisions are included to deflect the drive wheel out of contact with the disc when the organ is off. As shown in FIG. 9, a knob 110 with an easily grasped tab marker 112 is provided which can be pivoted towards "on" and "off" markings to turn the organ on and off. The knob 110 is fixed to a shaft 114 that is pivotally mounted on the organ housing and which carries a crank portion 116 at its rearward end. The crank portion is pivotally coupled to a link 118 that has a slot 120 engaged with a pin 122 projecting from the housing, to allow the link to slide and pivot. An outer end 124 of the link forms a hook which engages the axle 86 on which the drive wheel 48 is mounted.

When the knob 110 is rotated to an off position, the link 118 is pivoted so that the hook 124 moves downwardly and laterally to deflect the axle 86. This moves the drive wheel 48 out of contact with the disc record and the motor shaft. Thus, when the knob 110 is pivoted off, the drive wheel 48 is moved away from a disc record and the drive wheel and disc are protected against a permanent deformation. It is possible to produce a deformation of the drive wheel or disc by pulling out the electrical plug from a wall outlet when the knob 110 is on and the door 26 is closed, but there is only a small chance that this will occur.

The knob 110 is primarily used to operate an electrical switch 126 which closes or opens the electrical circuit that carries current to the electrical motor 84. The switch 126 has an operating member 128 which is in the path of the outer end of the axle 86. When the knob 110 is turned to an off position so that the axle 86 is deflected downwardly and laterally, the axle moves away from the operating member 128 to open the switch 126 and stop energization of the motor. It may be noted that the switch 126 is also turned off when the door 26 to the housing is opened, since opening of the door deflects the axle 86 in a direction to move away from the operating member 128 of the switch. The axle 86 may be deflected to different positions when deflected by opening the door 26 as compared to turning the knob 110 to an off position, but all of such positions provide the same effect. Thus, the axle 86 may be considered to have two basic positions, one where the drive wheel is against the record disc and motor shaft, and another where it is spaced from the disc and motor shaft.

Figure 2:
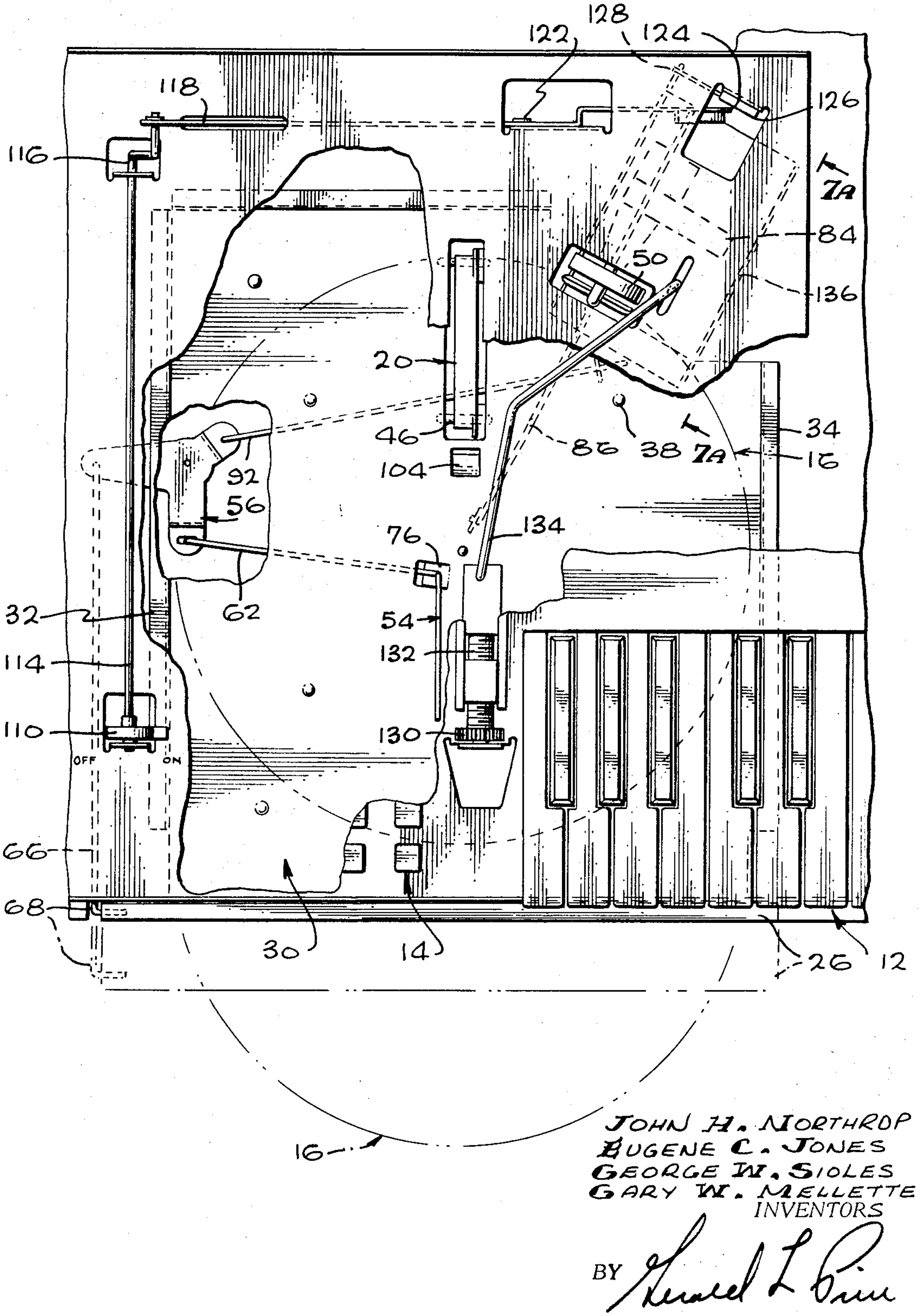
FIG. 2 is a sectional plan view of the disc driving region of the organ of FIG. 1.

The organ is constructed to allow for a change in speed of the record. As shown in FIG. 2, such a change in speed is accomplished by rotating a speed adjusting knob 130. Rotation of the knob 130 causes a screw 132 to move forward or backward, and causes a link 134 that is coupled to the screw to shift a bracket 136 on which the motor 84 is mounted. Shifting of the motor 84 causes its tapered shaft 82 to move so that a different diameter portion contacts the drive wheel 48. The drive wheel therefore rotates at a different speed and turns the disc record at a different speed, yet always contacts a disc record near the rim. It may be noted that the fact that the drive wheel is mounted on the axle 86 allows good contact between the drive wheel 48 and motor shaft 82 even if the bracket 136 does not move accurately in a straight line.

Figure 11:
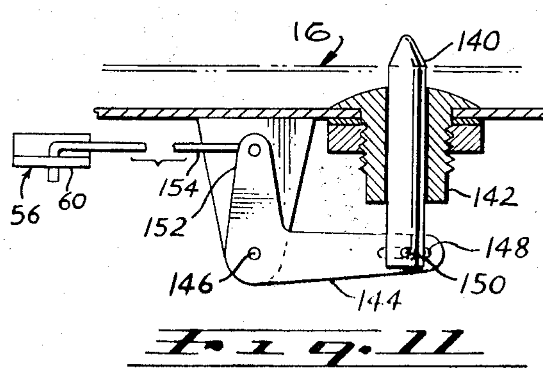
FIG. 11 is a partial sectional side elevation view of a spindle mechanism constructed in accordance with another embodiment of the invention.

FIG. 11 illustrates a portion of an organ constructed in accordance with another embodiment of the invention, wherein the organ includes a spindle 140 that moves up and down during insertion and removal of an optical disc record. The spindle 140 is slidably mounted in a bushing 142. A spindle-operating bracket 144 is employed which is pivotally mounted at 146 on the housing. The bracket has a slot 148 at one end that receives a pin 150 fixed to the spindle. The opposite end 152 of the bracket is pivotally connected to a rod 154. The rod 154 has an opposite end pivotally engaged with the arm 60 of the bell crank lever 56, in place of any record lifting member. When the door 26 to the organ housing is opened and lever 56 pivots, the rod 154 is pushed to pivot bracket 144 in a direction to lower the spindle 140, so it does not interfere with insertion of the record disc 16. Closing of the door causes the rod 154 to be pulled and the spindle 140 to rise through the hole at the center of the record disc.

Thus, the invention provides an electronic organ of a type which utilizes an optical disc, which enables rapid insertion and removal of a disc record and which protects the record against accidental permanent deformation. Rapid insertion of a record is enabled by the use of a linkage that is operated by opening of the door to raise a record lifting member that carries an inserted disc record over the spindle. Another linkage automatically disengages the drive wheel from the position of a disc record when the door opens. The region where the record is inserted has a pair of side walls and a back wall that assure proper placement of the record so that when the door is closed the record automatically falls onto the spindle. An on-off switch which is used to turn the organ on and off can deflect the drive wheel away from a disc record to prevent deformation of the drive wheel or record which might be caused by leaving the drive wheel against the record when it is not turning. The drive wheel is mounted on a movable shaft whose deflection controls an electrical switch so that whenever the drive wheel is not in a position to drive a disc record, the motor is turned off.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus which utilizes a disc record with tracks that define sounds to be produced comprising:

a housing having a doorway for receiving said disc record;

disc supporting means within said housing;

a door mounted on said housing for moving between a first position covering said doorway and a second position uncovering it;

pickup means responsive to said disc record for generating signals representing the sounds defined by said tracks in said disc record;

a backup roller positioned on a first face of a disc supported by said disc supporting means;

motor means including a driven output shaft;

drive wheel means including an axle pivotally mounted on said housing and carrying a rotatable member said axle pivotable between a first position wherein said rotatable member bears against said output shaft and against a face portion of said disc opposite said backup roller and a second position wherein said rotatable member is spaced from said output shaft and said disc; and means responsive to movement of said door between said first and second position for moving said axle of said drive wheel means between said first and second positions thereof.

2. The apparatus described in claim 1 including:

an on-off switch coupled to said motor means to control energization thereof, said switch having an operating portion in the path of said axle for operating said switch to an off state when said axle is moved to said second position thereof.

3. Apparatus which utilizes a disc record with tracks that define sounds to be played comprising:

a housing having a doorway through which said disc record can be received;

stationary disc supporting means for rotatably supporting said disc record within said housing;

an electric motor having an output shaft;

on-off switch means coupled to said motor for controlling the energization of said motor, said switch means including a knob which can be manually moved between on and off positions to control the state of said switch means;

a backup roller positioned on a first face of a disc record which is supported on said disc supporting means;

a drive wheel;

a drive wheel axle having an inner portion and an outer portion, said drive wheel rotatably mounted on said outer portion, and said inner portion of said axle pivotally mounted on said housing to allow said outer portion to move between a first position wherein said drive wheel is engaged with a second face of said disc record opposite said first face thereof and with the output shaft and a second position wherein it is disengaged from said second face of said disc record and from the output shaft; and first link means responsive to movement of said knob of said on-off switch means between on and off positions for moving said drive wheel axle from said first position to said second position, respectively, while said disc supporting means remains stationary.

4. The apparatus described in claim 3 including:

a door mounted on said housing for movement between a first position covering said doorway and a second position uncovering it; and second link means responsive to movement of said door between said first and second positions for moving said drive wheel axle from said first position to said second position.

5. The apparatus described in claim 4 wherein:

said on-off switch means includes a switch for interrupting the flow of current to said motor, said switch having an operating member positioned in the path of said outer portion of said drive wheel axle which maintains said switch in an off state when said drive wheel axle is in said second position.

6. Apparatus which utilizes a disc record with a hole at its center and with tracks that define sounds to be produced comprising:

a housing having a doorway for receiving said disc record and having a ramp;

disc supporting means within said housing for supporting a disc at a position above said ramp, including a spindle for projecting into said central hole of said disc record;

a door mounted on said housing for moving between a first position covering said doorway and a second position uncovering it;

means for rotatably driving a disc on said disc supporting means;

means for generating sounds defined by said tracks in said disc record;

a disc lifting member mounted on said housing including a ramp engaging portion lying on said ramp and an inner portion; and means responsive to movement of said door between said first and second positions and coupled to said disc lifting member for raising and lowering said disc engaging portion of said disc lifting member, including a lever pivotally mounted on said housing and a link coupling said door to said lever to pivot said lever in first and second directions as said door is opened and closed, said inner portion of said disc lifting member being pivotally coupled to said lever to move said lifting member up and down said ramp as said lever pivots in said first and second directions.

7. The apparatus described in claim 6 wherein:

said disc lifting member includes a wire which has an outer end that extends from said ramp-engaging portion substantially forwardly towards said doorway, to define an upward incline when said disc lifting member is raised.

8. Apparatus which utilizes a disc record with tracks that define sounds to be played comprising:

a housing having a doorway through which said disc record can be received;

disc supporting means for rotatably supporting said disc record within said housing;

an electric motor having a tapered output shaft;

on-off switch means coupled to said motor for controlling the energization of said motor, said switch means including a knob which can be manually moved between on and off positions to control the state of said switch means;

a backup roller positioned on a first face of a disc record which is supported on said disc supporting means;

a drive wheel;

a drive wheel axle having an inner portion and an outer portion, said drive wheel rotatably mounted on said outer portion, and said inner portion of said axle mounted on said housing to allow said outer portion to move between a first position wherein said drive wheel is engaged with a second face of said disc record opposite said first face thereof and a second position wherein it is disengaged from said second face of said disc record;

first link means responsive to movement of said knob of said on-off switch means between on and off positions for moving said drive wheel axle from said first position to said second position, respectively; and means for movably mounting said motor so that different diameter portions of said output shaft can contact said drive wheel to rotate it at different speeds;

said drive wheel shaft being mounted to move said drive wheel against and away from said motor output shaft when said drive wheel shaft is moved between said first position and said second position, whereby to enable firm engagement of said drive wheel with said motor output shaft at all positions of said output shaft.

* * * * *